(12) United States Patent
Bleys et al.

(10) Patent No.: US 8,519,062 B2
(45) Date of Patent: *Aug. 27, 2013

(54) ELASTOMERIC MATERIALS HAVING A HIGH HARDBLOCK CONTENT AND PROCESS FOR PREPARING THEM

(75) Inventors: Gerhard Jozef Bleys, Heverlee (BE); Hans Godelieve Guido Verbeke, Lubbeek (BE)

(73) Assignee: Huntsman International LLC, The Woodlands, TX (US)

( * ) Notice: Subject to any disclaimer, the term of this patent is extended or adjusted under 35 U.S.C. 154(b) by 324 days.

This patent is subject to a terminal disclaimer.

(21) Appl. No.: 12/866,803

(22) PCT Filed: Feb. 5, 2009

(86) PCT No.: PCT/EP2009/051321
§ 371 (c)(1),
(2), (4) Date: Sep. 20, 2010

(87) PCT Pub. No.: WO2009/101027
PCT Pub. Date: Aug. 20, 2009

(65) Prior Publication Data
US 2011/0136991 A1    Jun. 9, 2011

(30) Foreign Application Priority Data
Feb. 14, 2008 (EP) ............................ 08101619

(51) Int. Cl.
*C08G 18/42* (2006.01)
*C08G 18/48* (2006.01)
*C08G 18/62* (2006.01)

(52) U.S. Cl.
USPC ............. 525/458; 525/459; 525/460; 528/77; 528/44

(58) Field of Classification Search
USPC ................ 525/458, 459, 460; 528/77, 44
See application file for complete search history.

(56) References Cited

U.S. PATENT DOCUMENTS 3,766,071 A * 10/1973 Wulfers ..................... 508/464
4,242,468 A    12/1980 Baack et al.
(Continued)

FOREIGN PATENT DOCUMENTS

EP    912623 A    5/1999
EP    1104775 A    6/2001
(Continued)

OTHER PUBLICATIONS

Yu Ming, Xu Qiang, and Wang Guiyou "Polyurethane Based Plasticizer", *Polyurethane Industry*, 2006, 21 (2), p. 1-3.
(Continued)

*Primary Examiner* — Mike M Dollinger
(74) *Attorney, Agent, or Firm* — Robert A. Diaz

(57) ABSTRACT

Elastomeric material having a density of more than 100 kg/m$^3$ and comprising
a matrix material comprising a plurality of urethane, urea and/or isocyanurate groups and having a hardblock content of more than 50% (hereinafter called matrix A); and
a polymeric material which 1) has no groups which are able to form a urethane, urea or isocyanurate group with an isocyanate group, 2) is interpenetrating said matrix A, and 3) is the reaction product of a polyisocyanate and a polymer having an average molecular weight of more than 500 and one isocyanate-reactive group at an isocyanate index of 100-250 (hereinafter called polymeric material B); and wherein the relative amount of all ingredients used to make said matrix A and of said polymeric material B, on a weight basis, ranges from 10:90 to 90:10 and process for making such materials.

8 Claims, 1 Drawing Sheet

(56) References Cited

U.S. PATENT DOCUMENTS

| | | | |
|---|---|---|---|
| 4,265,798 A | | 5/1981 | Mishra |
| 4,616,071 A | * | 10/1986 | Holubka ................ 525/524 |
| 5,525,654 A | * | 6/1996 | Podola et al. ............ 524/199 |
| 5,968,993 A | * | 10/1999 | Bleys ...................... 521/50 |
| 6,218,462 B1 | | 4/2001 | Pantone |
| 6,355,721 B1 | | 3/2002 | Pantone |
| 6,384,130 B1 | * | 5/2002 | Pantone et al. ............ 524/590 |
| 6,403,702 B1 | * | 6/2002 | Markusch et al. .......... 524/590 |
| 6,503,980 B2 | * | 1/2003 | Pantone et al. ............ 524/589 |
| 6,806,342 B2 | | 10/2004 | Bleys et al. |
| 7,687,548 B2 | * | 3/2010 | Bleys et al. ............... 521/159 |
| 2006/0084777 A1 | | 4/2006 | Bleys et al. |
| 2008/0262168 A1 | | 10/2008 | Bleys et al. |
| 2009/0005517 A1 | | 1/2009 | Bleys et al. |
| 2009/0069456 A1 | | 3/2009 | Bleys et al. |
| 2011/0003944 A1 | * | 1/2011 | Bleys et al. ............... 525/452 |
| 2011/0015287 A1 | * | 1/2011 | Bleys et al. ............... 521/82 |

FOREIGN PATENT DOCUMENTS

| | | |
|---|---|---|
| EP | 1108735 A | 6/2001 |
| EP | 1217021 A | 6/2002 |
| GB | 2028356 A | 3/1980 |
| WO | WO 02/10249 A | 2/2002 |
| WO | WO 2004/111101 A | 12/2004 |
| WO | WO 2007/042411 A | 4/2007 |
| WO | WO 2007042411 A1 * | 4/2007 |
| WO | WO 2007/096216 A | 8/2007 |
| WO | WO 2007/104623 A | 9/2007 |

OTHER PUBLICATIONS

Harry Chen, Jingcun Wang, Jianming Yu "A New Technique for Making MDI Semi-flexible Foams without Polyols", CPI Technical Conference, Sep. 24-26, 2007, Orlando (USA), pp. 154-161.

Woods, G., Editor, "Isocyanates" *The ICI Polyurethanes Book*, $2^{nd}$ Edition, (1990), p. 32-35.

IUPAC Compendium of Chemical Technology, $2^{nd}$ Edition, 1997.

\* cited by examiner

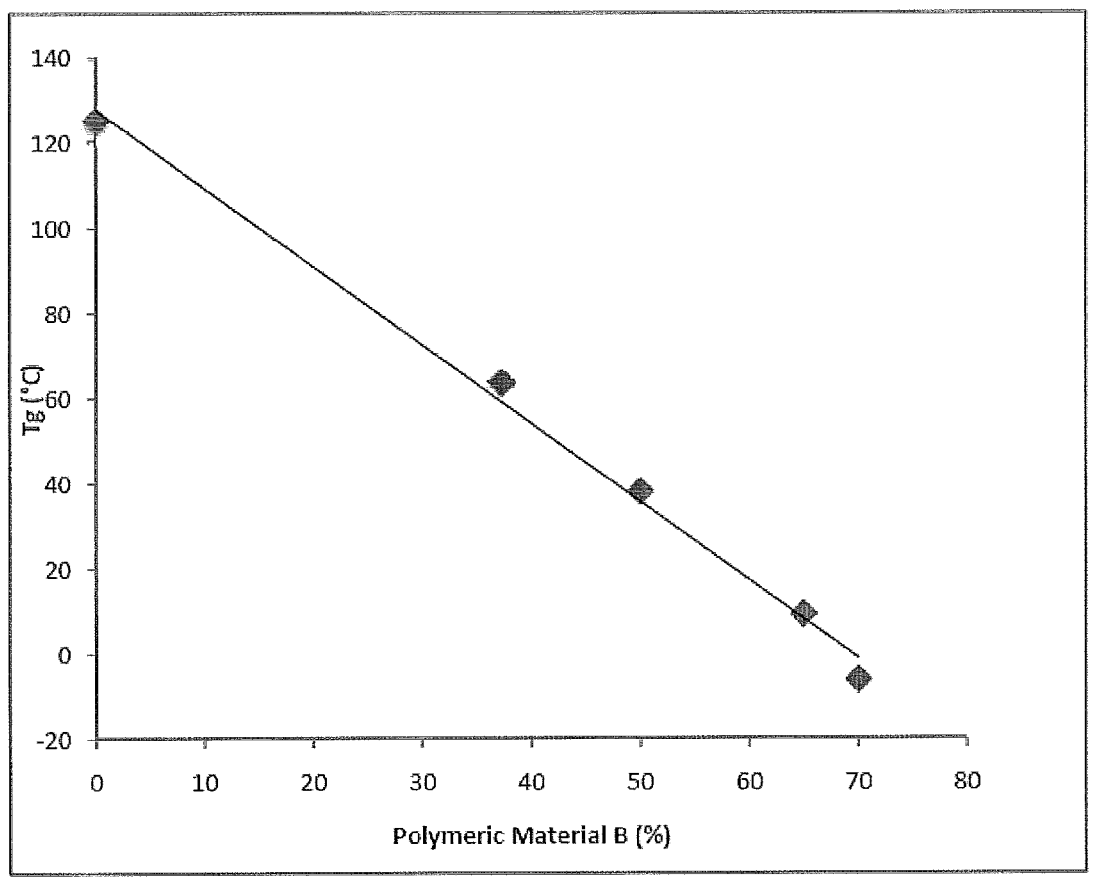

ELASTOMERIC MATERIALS HAVING A HIGH HARDBLOCK CONTENT AND PROCESS FOR PREPARING THEM

BACKGROUND OF THE INVENTION

1. Field of the Invention

The present invention relates to elastomeric materials comprising a material having a hardblock content of more than 50%, the elastomeric material having a density of more than 100 kg/m$^3$ and comprising a plurality of urethane, urea and/or isocyanurate groups.

2. Background Information

Elastomeric materials having a density of at least 100 kg/m$^3$ and comprising a plurality of urethane, urea and/or isocyanurate groups have been widely described. Most disclosures relate to the more traditional elastomers with regard to hardblock content, although hardblock content in these disclosures is not explicitly referred to. More traditional elastomers show a hardblock content between 25 and 40%.

Controlling the glass transition temperature and the hardness of these elastomers is done by varying the amount of polyols having a high molecular weight (and therefore the hardblock content of the elastomer). This requires careful balancing of reaction conditions and catalyst types and contents. Often different catalysts are required simultaneously in order to control the curing and the final properties of the material. Also the stream ratios between the polyisocyanate stream and the isocyanate-reactive material stream will change, often necessitating changes in mixing devices like changing injection nozzles. Alternatively or additionally plasticizers can be used when lowering the hardblock content would result in poor processing and mechanical properties like tear and tensile strength. Current practice is to use unreactive plasticizers like phthalates or other relatively low molecular weight, solvent-type materials. These plasticizers, however, show the tendency to exude over time which may give rise to a consequential degradation of material properties, fogging and a negative effect on the environment and health situation. Therefore plasticizers have been developed which show less tendency to migrate, like diurethane compounds having a high molecular weight, see e.g. U.S. Pat. No. 6,503,980, U.S. Pat. No. 6,384,130, U.S. Pat. No. 6,355,721 and U.S. Pat. No. 6,218,462.

U.S. Pat. No. 5,525,654 describes the use of diurethanes as plasticizers in sealing and/or adhesive compositions. The diurethanes may be the reaction products of diisocyanates and mono-functional alcohols, which may be selected from monoalkyl polyether alcohols. U.S. Pat. No. 4,824,888 also describes the use of diurethanes in sealings.

U.S. Pat. No. 6,355,721 relates to plasticizers comprising the reaction product of an isocyanate-terminated polyether prepolymer and a monofunctional alcohol having a molecular weight of about 32 to about 1000. The plasticizer has a high molecular weight and is liquid and non-migrating and is non-reactive; it is used in elastomers.

U.S. Pat. No. 6,218,462 relates amongst others to plasticizers made from polyisocyanates and mono alcohols having a molecular weight of more than 4000. They are used in elastomers.

EP 1104775 discloses the use of liquid, diurethane plasticizers made from a diisocyanate and a monoalcohol having a molecular weight of about 100 to about 1000. EP 1108735 and EP 1217021 also relate to polyurethane plasticizers.

PCT/EP2007/051335 discloses products which are obtained by reacting a diisocyanate, a monoalkoxy polyoxyalkylene monoamine and water. They are used as cell opener and rheology modifier.

Polyurethane Industry 2006, 21 (2): 1-3 discloses plasticizers made from diisocyanates, diols and monools and from monoisocyanates and monools.

Disclosures related to materials having a density of more than 100 kg/m$^3$ and having a high hardblock content are less frequently made; examples are EP 912623, WO 02/10249, WO 04/111101, WO 07/042411 and WO 07/096216.

In a recent article by Harry Chen et al. presented at the CPI Technical Conference in Orlando, Fla., USA on 24-26 Sep. 2007 MDI semi-flexible foams having a very low density were made without polyols by reacting polyisocyanate and water in the presence of two non-reactive additives. The additives behave as plasticizers which soften the hard polymer matrix and provide flexibility to the foams. Chen does not disclose the chemical nature of the additives.

GB 2028356 discloses the use of monohydroxy-terminated polybutadiene as plasticizer in polyurethanes and in particular in polyurethane elastomers.

U.S. Pat. No. 4,265,798 discloses isocyanurate cross linked polyurethanes having a hardblock content of 100%.

SUMMARY OF THE INVENTION

The present invention is directed to an elastomeric material having a density of more than 100 kg/m$^3$ and comprising: (a) a matrix material comprising a plurality of urethane, urea and/or isocyanurate groups and having a hardblock content of more than 50%; and (b) a polymeric material which 1) has no groups which are able to form a urethane, urea or isocyanurate group with an isocyanate group, 2) is interpenetrating said matrix, and 3) is the reaction product of a polyisocyanate and a polymer having an average molecular weight of more than 500 and one isocyanate-reactive group at an isocyanate index of 100-250; and wherein the relative amount of all ingredients used to make said matrix and said polymeric material, on a weight basis, ranges from 10:90 to 90:10. The present invention is also directed to a process for preparing such an elastomeric material.

The present invention is also directed to a process for making an elastomeric material having a density of more than 100 kg/m$^3$ and a predetermined glass transition temperature, the process comprising: (1) selecting a) the ingredients for making a matrix material having a hardblock content of more than 50% and comprising a plurality of urethane, urea and/or isocyanurate groups and b) a polymeric material which has no groups which are able to form a urethane, urea and/or isocyanurate group with an isocyanate group and which material is the reaction product of a polyisocyanate and a polymer having an average molecular weight of more than 500 and one isocyanate reactive group at an index of 100-250; (2) selecting from a representation, plotting the relationship between the weight ratio of the selected ingredients and the selected material on the one hand and the glass transition temperature of the elastomer made from these selected ingredients and this material on the other hand, the weight ratio corresponding to the predetermined glass transition temperature; (3) mixing the selected ingredients and the selected material in the selected weight ratio; and (4) allowing this mixture to react.

BRIEF DESCRIPTION OF THE DRAWINGS

A full understanding of the invention can be gained from the following description of certain embodiments of the invention when read in conjunction with the accompanying drawings in which:

FIG. 1 is a graph showing the relationship between $T_g$ and the percent of Polymeric Material B.

DETAILED DESCRIPTION OF THE INVENTION

When materials having a high density and a high hardblock content are made from polyisocyanates and isocyanate reactive materials, the reaction is strongly exothermic. The temperature may rise to such levels, that the preparation of the materials becomes unsafe or even impossible. The material often starts to show scorching and/or discolouration. Further undesirable side reactions may take place resulting in potentially hazardous and toxic compounds. The process may even lead to fire hazards. This is particularly so at hardblock levels above 75% and more in particular above 90% and especially at 100%.

Solid and blown elastomers with a controlled glass transition temperature (Tg) and with controlled damping properties are useful in many applications like in footwear, spring aids for cars, shock absorbing sports wear like knee pads and shin protectors. The Tg of these conventional systems is usually controlled by varying the hardblock content, the polyol type and its molecular weight and the hardblock-softblock phase separation and can therefore not be changed without reformulating and redesigning the process and without changing many of the other properties of the material.

Surprisingly, it was found that elastomeric materials having a high density and comprising a material having a high hardblock content may be safely made by using a specifically defined polymeric material. Also surprisingly, it was found that the process allows for a simple way of producing an elastomeric material with a certain, previously selected Tg in a very accurate way, without the need to change the formulation and the process and with limited effect on many of the other physical properties and while using only a limited amount of components. This Tg selection can be made over a wide temperature range, sometimes of more than 200° C., by simply varying the relative amounts of the ingredients used to make the material having a high hardblock content on the one hand and of a specifically defined polymeric material on the other hand. The glass transition of the elastomeric materials according to the present invention takes place over a narrow temperature range, surprisingly.

Therefore the present invention is concerned with an elastomeric material having a density of more than 100 kg/m³ and comprising:
  a matrix material comprising a plurality of urethane, urea and/or isocyanurate groups and having a hardblock content of more than 50% (hereinafter called matrix A); and
  a polymeric material which 1) has no groups which are able to form a urethane, urea or isocyanurate group with an isocyanate group, 2) is interpenetrating said matrix A, and 3) is the reaction product of a polyisocyanate and a polymer having an average molecular weight of more than 500 and one isocyanate-reactive group at an isocyanate index of 100-250 (hereinafter called polymeric material B); and wherein the relative amount of all ingredients used to make said matrix A and of said polymeric material B, on a weight basis, ranges from 10:90 to 90:10.

Further the present invention relates to a process for preparing the above elastomeric material which process comprises reacting the ingredients for making the above matrix A in the presence of the above polymeric material B wherein the relative amount of the ingredients for making matrix A and of the above polymeric material B, on a weight basis, ranges from 10:90 to 90:10.

Still further the present invention relates to a process for making an elastomeric material having a density of more than 100 kg/m³ and a predetermined glass transition temperature which process comprises:
  1) selecting a) the ingredients for making a matrix material having a hardblock content of more than 50% and comprising a plurality of urethane, urea and/or isocyanurate groups and b) a polymeric material which has no groups which are able to form a urethane, urea and/or isocyanurate group with an isocyanate group and which material is the reaction product of a polyisocyanate and a polymer having an average molecular weight of more than 500 and one isocyanate reactive group at an index of 100-250;
  2) selecting from a representation, showing the relationship between the weight ratio of the selected ingredients and the selected material on the one hand and the glass transition temperature of the elastomer made from these selected ingredients and this material on the other hand, the weight ratio corresponding to the predetermined glass transition temperature;
  3) mixing the selected ingredients and the selected material in the selected weight ratio; and
  4) allowing this mixture to react.

In the context of the present invention the following terms have the following meaning:
  1) isocyanate index or NCO index or index:
    the ratio of NCO-groups over isocyanate-reactive hydrogen atoms present in a formulation, given as a percentage:

$$\frac{[NCO] \times 100}{[\text{active hydrogen}]} \ (\%).$$

In other words the NCO-index expresses the percentage of isocyanate actually used in a formulation with respect to the amount of isocyanate theoretically required for reacting with the amount of isocyanate-reactive hydrogen used in a formulation.
  It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.
  2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.
4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
5) The word "average" refers to number average unless indicated otherwise.
6) The term "hardblock content" refers to 100 times the ratio of the amount (in pbw) of polyisocyanate+isocyanate-reactive materials having a molecular weight of 500 or less (wherein polyols having a molecular weight of more than 500 incorporated in the polyisocyanates are not taken into account) over the amount (in pbw) of all polyisocyanate+all isocyanate-reactive materials used in making the matrix. In this calculation the amount of the polymeric material B used is not taken into account. The hardblock content of matrix A preferably is at least 75%, more preferably at least 90% and most preferably 100%.
7) Density: Is the overall density measured according to ISO 845.

The polymeric material B is made by reacting a polyisocyanate with a polymer having an average molecular weight of more than 500 and one isocyanate-reactive group at an index of 100-250. The polyisocyanate for making polymeric material B may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI). MDI and polyisocyanate compositions comprising MDI are most preferred and especially those from 1) a diphenylmethane diisocyanate comprising at least 35%, preferably at least 60% and most preferably at least 85% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2-4 and an average molecular weight of at most 1000; 4) a diphenylmethane diisocyanate comprising a homologue comprising 3 or more isocyanate groups; and 5) mixtures of any of the aforementioned polyisocyanates.

Polyisocyanate 1) comprises at least 35% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec$^R$ MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec$^R$ 2020, ex Huntsman.

Urethane modified variants of the above polyisocyanate 1) are also known in the art, see e.g. The ICI Polyurethanes Book by G. Woods 1990, $2^{nd}$ edition, pages 32-35.

Polyisocyanate 4) is also widely known and commercially available. These polyisocyanates are often called crude MDI or polymeric MDI. Examples are Suprasec$^R$ 2185 and Suprasec$^R$ DNR ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec$^R$ 2021 ex Huntsman Polyurethanes.

The polymer having an average molecular weight of more than 500 and one isocyanate-reactive group used for making polymeric material B may be selected from monools, monoamines and monocarboxylic acids having polyester, polyether and/or polyolefin backbones and mixtures thereof, preferably having a molecular weight of more than 500 to 6000 and more preferably of 800-3000. Such polymers are known and commercially available; examples are Jeffamine® M2070, M2005, M600 and M1000 ex Huntsman; Jeffamine is a trade mark of the Huntsman Corporation or an affiliate thereof which has been registered in one or more but not all countries.

Most preferred are the polyether monools and monoamines, especially monoalkylether polyoxyethylene polyoxypropylene monools and monoamines having an average molecular weight of more than 500 to 6000 and preferably of 800-3000 wherein the oxyethylene content preferably is at least 50% by weight calculated on the weight of the monool or monoamine and wherein the alkyl group preferably has 1-8 carbon atoms. Monoamines are most preferred.

The relative amounts of the polyisocyanate and the polymer having one isocyanate-reactive group may vary in such a way that the index is 100-250 and preferably 100-150. Polymeric material B is prepared by combining and mixing the polyisocyanate and the polymer and allowing the mixture to react. When the reaction is conducted at an index of 100, urea groups are formed from the amine groups and the isocyanate groups and urethane groups are formed from the hydroxy groups and isocyanate groups. These reactions are exothermic and do not need heating or catalysis although catalysts may be used and although the MDI may be added at slightly elevated temperature (e.g. up to 60° C.) in order to ensure liquidity. After the reacting mixture has cooled back to room temperature, the reaction may be regarded as complete. When the reaction is conducted at an index of more than 100, the excess of the polyisocyanate is to react with formed urea groups leading to biuret groups and/or formed urethane groups leading to allophanate groups (for allophanate formation a catalyst may be desirable). This reaction preferably is encouraged by conducting the reaction at elevated temperature, e.g. 80 to 150° C. for e.g. 30 minutes to 24 hours. The composition obtained contains compounds comprising urea and/or urethane groups and—in case the index was above 100—compounds comprising biuret and/or allophanate, groups and does not form urethane, urea or isocyanurate groups in the presence of polyisocyanates, polyols and polyamines. No other reactants are used in preparing polymeric material B.

Matrix A is prepared by reacting a polyisocyanate with a polyol giving a plurality of urethane groups and/or by reacting a polyisocyanate with a polyamine giving a plurality of urea groups and/or by allowing the polyisocyanate to trimerize using a trimerization catalyst and giving a plurality of isocyanurate groups.

By conducting these reactions in the presence of polymeric material B an elastomeric material according to the present invention may be obtained.

In order to obtain an elastomeric material according to the present invention the density of the elastomeric material is to be more than 100 kg/m$^3$, the hardblock content of matrix A is to be more than 50% and the relative amount on a weight basis of the ingredients used to make said matrix A and of said polymeric material B should range from 10:90 to 90:10 and preferably from 20:80 to 80:20.

In order to obtain an elastomeric material having a density of more than 100 kg/m$^3$ the preparation of matrix A is to be conducted either in the absence of blowing agent leading to unblown elastomeric materials which have a density of more than 1000 kg/m$^3$ or in the presence of blowing agent in an amount commensurate with the desired density which is to be above 100 kg/m$^3$. The actual amount of blowing agent needed depends on the ingredients used to make matrix A, on the type of polymeric material B, on the production process, on the selected blowing agent and on the desired density. The determination of the amount of blowing agent once the ingredients for making matrix A, the type of polymeric material B, the process and the desired density have been selected, is daily routine for a person who is ordinary skilled in the art, especially in the light of the examples.

Blowing agents may be selected from inert blowing agents and reactive blowing agents. Examples of inert blowing agents are alkanes, hydrofluorocarbons, hydrochlorofluorocarbons, expandable microbeads and inert gases like air, $N_2$, $CO_2$, CO, $O_2$ and He and examples of reactive blowing agents are azodicarbonamide and water. Combinations and/or mixtures of these blowing agents may be used as well. Water is the most preferred blowing agent. For making elastomeric materials having a density of more than 100 kg/m$^3$ an amount of water of less than 1% by weight, calculated on the weight of the ingredients to make matrix A, is sufficient.

In order to ensure that the hardblock content of matrix A is more than 50%, the amount of polyisocyanates and isocyanate-reactive ingredients used in making matrix A and having a molecular weight of 500 or less and a molecular weight of more than 500 are chosen in such a way that the hardblock content of the materials is more than 50% as defined hereinbefore.

In making matrix A, the polyisocyanates may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI). MDI and polyisocyanate compositions comprising MDI are most preferred.

Isocyanate-reactive materials having a molecular weight of more than 500, when used in making matrix A may be selected from polyester polyols, polyether polyols, polyether polyester polyols, polyester polyamines, polyester polyether polyamines and polyether polyamines. Preferably these isocyanate-reactive materials have an average molecular weight of more than 500-10,000 and an average nominal functionality of 2-6. Such materials have been widely described in the art and are commercially available.

Isocyanate-reactive materials having a molecular weight of at most 500, when used in making matrix A, may be selected from the chain extenders and cross-linkers commonly used in making elastomers of this type like ethylene glycol, polyethylene glycol having an average molecular weight of at most 500, 2-methyl-1,3-propanediol, neopentylglycol, propanediol, butanediol, pentanediol, hexanediol, ethylene diamine, toluene diamine, propylene glycol, polypropylene glycol having an average molecular weight of at most 500, glycerol, trimethylolpropane, sucrose and sorbitol and mixtures thereof.

Any compound that catalyses the isocyanate trimerisation reaction (isocyanurate-formation) can be used as trimerisation catalyst in the process according to the present invention, such as tetraalkylammonium hydroxides (e.g. tetramethylammonium hydroxide, tetraethylammonium hydroxide and tetrabutylammonium hydroxide), organic weak acid salts (e.g. tetramethylammonium acetate, tetraethylammonium acetate, tetrabutylammonium acetate), trimethylhdyroxypropylammonium acetate, -octoate and -formate, trimethylhydroxyethylammonium acetate, triethylhydroxypropylammonium acetate and triethylhydroxyethylammonium acetate, trialkylhydroxyalkylammonium hydroxides (e.g. trimethylhydroxypropylammonium hydroxide, trimethylhydroxyethylammonium hydroxide, triethylhydroxypropylammonium hydroxide and triethylhydroxyethylammonium hydroxide), tertiary amines e.g. triethylamine, triethylenediamine, 1,5-diazabicyclo[4.3.0]nonene-5,1,8-diazabicyclo [5.4.0]-undecene-7 and 2,4,6-tris(dimethylaminomethyl) phenol and metal salts of alkylcarboxylic acids having 1-12 carbon atoms like alkali metal salts of such carboxylic acids (preferred alkali metals are potassium and sodium, and preferred carboxylic acids are acetic acid, hexanoic acid, octanoic acid, lactic acid and 2-ethylhexanoic acid; most preferred metal salt trimerisation catalysts are potassium acetate (commercially available as Polycat 46 from Air Products and Catalyst LB from Huntsman) and potassium 2-ethylhexanoate (commercially available as Dabco K15 from Air Products). Two or more different trimerisation catalysts may be used in the process of the present invention.

If used, the trimerisation catalyst is used in an amount of up to 3% by weight based on the weight of the polyisocyanate used in making matrix A and preferably up to 1% by weight.

In addition to the above ingredients, other ingredients used in the art for making materials comprising a plurality of urethane, urea and/or isocyanurate groups may be used like other catalysts, e.g. for enhancing urethane formation, surfactants, fire retardants, colourants, pigments, anti-microbial agents, fillers, internal mould release agents, cell-stabilizing agents and cell-opening agents.

In preparing the elastomeric materials, the polymeric material B may be added to the reaction mixture independently or after having been premixed with one or more of the ingredients used to make matrix A.

This provides a further advantage in preparing such elastomeric materials. On an industrial scale such materials are often made by feeding separate streams of polyisocyanate, polyol and/or polyamine and/or further ingredients to a mixer and/or a reactor. Since the polymeric material B may be combined with all of these streams, stream ratios may be controlled, improving mixing properties and rheology during production. Stream ratios can not be controlled in this way when making traditional elastomers.

In making the elastomeric material according to the present invention one or more of the following reactions take place: reaction of polyisocyanates and polyols giving polyurethanes, reaction of polyisocyanates and polyamines giving polyureas, reaction of polyisocyanates and water giving blown polyureas and trimerization of polyisocyanates giving polyisocyanurates.

The reaction of the polyisocyanates and the polyols is exothermic and may be conducted under ambient conditions. If desired the reaction may be enhanced by using a catalyst which stimulates urethane formation and/or by applying an increased temperature, e.g. 30-80° C. No further special measures are to be taken since the reaction will go to completion by itself due to the exothermic character.

The reaction of the polyisocyanates with the polyamines and/or the water is strongly exothermic and does not require heating or catalysis, although the polyisocyanates may be supplied at slightly increased temperature (e.g. up to 50° C.) to ensure liquidity and although heat and/or catalysis may be applied, if desired.

The trimerization reaction requires the use of a trimerization catalyst. When trimerization is the only reaction, preferably heat is supplied in order to ensure a temperature of 50-100° C. If one of the other reactions takes place, only a trimerization catalyst is needed. The exotherm of the other reaction ensures that trimerization takes place.

The reactions for preparing the elastomeric material in general will go to completion between 1 minute and 2 hours and preferably between 1 minute and 1 hour.

The reaction for preparing the elastomeric material according to the present invention preferably is conducted at an index of at least 80, more preferably at least 90 and most preferably at least 95.

The reaction for preparing the elastomeric material according to the present invention may be conducted according to the one shot process, the semi-prepolymer process and the prepolymer process. The reaction may be conducted in an open container, in an open or closed mould, as a slabstock process or after the ingredients have been sprayed or applied on a substrate.

The elastomeric material according to the present invention is a so-called semi-interpenetrating polymer network wherein the polymeric material B penetrates on a molecular scale the polymer network which is matrix A (see IUPAC Compendium of Chemical Terminology, $2^{nd}$ Edition, 1997).

The elastomeric material preferably comprises a matrix material which is a thermosetting material. Such a thermosetting matrix material is made by reacting the polyisocyanate and the isocyanate-reactive ingredients used for preparing matrix A while ensuring that at least one of the two has an average functionality of more than 2.1 in order to provide cross-linking. If a polyisocyanurate matrix is made cross linking will be sufficient; such materials are thermosetting.

The elastomeric material may be widely used, e.g. in footwear, spring aids, shock absorbing sports wear like knee and shoulder pads and shin protectors.

The density of the elastomeric material according to the present invention preferably is at least 300 $kg/m^3$ and more preferably at least 500 $kg/m^3$ and most preferably at least 1000 $kg/m^3$.

EXAMPLES

The invention is illustrated with the following examples.

The following ingredients were used:

Monoamine 1: Jeffamine M2070, a linear polymer having an average molecular weight of about 2000 and comprising at one end a methyl group and at the other a primary amine group and oxyethylene and oxypropylene groups in between, with an oxyethylene content of 76% by weight calculated on the weight of the polymer.

Monoamine 2: Jeffamine M2005, as M2070 but with 8% by weight oxyethylene groups.

Suprasec 1306, 2185 and 2020: described before.

$Daltocel^R$ F555: a polyether polyol ex Huntsman having a molecular weight of about 5600 Daltocel is a trademark of Huntsman Corporation or an affiliate thereof which has been registered in one or more but not all countries.

Example 1

Polymeric materials B were made as follows. The monofunctional ingredient was put in a 5 liter flask recipient equipped with a stirrer, thermocouple and nitrogen purge. Polyisocyanate was added slowly under stirring (Suprasec 1306 was preheated at 50° C., Suprasec 2185 was not preheated).

In case of the use of monoamines at index 100 no extra heat was applied. In case of the use of monoamines at index of 150 and 200 the mixture was heated to 120° C. for 5 hours. In case of the use of monool, 0.025% w of dibutyltindilaurate (catalyst) was added and the mixture was kept at 80° C. for 3 hours.

The following Table 1 gives the polyisocyanates, monofunctional ingredients and index used and the viscosity in cPs at 25° C. measured with a Brookfield Viscometer CAP 2000+ with CAP spindle number 1.

TABLE 1

| Polymeric material B | Polyisocyanate | Monofunctional ingredient | Index | Viscosity |
|---|---|---|---|---|
| 1 | S1306 | M2070 | 100 | 3200 |
| 2 | S1306 | M2005 | 100 | 4300 |
| 3 | S2185 | M2070 | 100 | 8850 |

Infrared analysis showed no free NCO groups in these polymeric materials B and the presence of urea groups.

Blown elastomers were made as follows:

A polyol blend including a polymeric material B as made in Table 1 (when used) was mixed with polyisocyanate for 15 seconds. 200 g of this mixture was poured in an aluminium mould of 15×20×1.5 cm which was kept at 60° C. Then the mould was closed and the mixture was allowed to react. After 5 minutes the elastomer was demoulded and post cured in an oven at 100° C. for 4 hours.

Table 2 gives the ingredients used for making the elastomers and the amounts in parts by weight and some physical properties.

TABLE 2

| | Elastomer | | | | | | | |
|---|---|---|---|---|---|---|---|---|
| Polyol Blend | 1* | 2 | 3 | 4 | 5 | 6 | 7 | 8 |
| Daltocel F555 | 39.74 | 31.79 | 29.80 | 27.81 | 31.79 | 29.80 | 27.81 | 27.81 |
| 2-methyl-1,3-propanediol | 11.6 | 9.28 | 8.70 | 8.12 | 9.28 | 8.70 | 8.12 | 8.12 |
| water | 0.35 | 0.28 | 0.26 | 0.24 | 0.28 | 0.26 | 0.24 | 0.24 |
| Dabco EG | 0.21 | 0.17 | 0.16 | 0.15 | 0.17 | 0.16 | 0.15 | 0.15 |
| Polymeric material B  1 | — | 20 | 25 | 30 | — | — | — | — |
| 3 | — | — | — | — | 20 | 25 | 30 | — |
| 2 | — | — | — | — | — | — | — | 30 |
| Suprasec 2020 | 48.1 | 38.51 | 36.10 | 33.69 | 38.51 | 36.10 | 33.69 | 33.69 |
| Hardblock content of the matrix, % | 60 | 60 | 60 | 60 | 60 | 60 | 60 | 60 |
| Density of the elastomer, kg/m³, ISO 845 | 346 | 386 | 408 | 426 | 390 | 396 | 388 | 422 |
| Hardness Shore A, ISO 868 | 83 | 21 | 20 | 15 | 21 | 15 | 13 | 44 |
| Compression Hardness at 65%, kPa, ISO 3386-1 | 7925 | 850 | 715 | 625 | 785 | 620 | 515 | 1884 |

*= comparative

When the polymeric material B was removed and replaced with Daltocel F555 (and the hardblock content of the matrix was lowered to 48 and 42) an elastomeric material was obtained having a density of 418 and 422 kg/m³ respectively. The compression hardness at 65% deformation however was 1355 and 1175 kPa respectively.

It is to be noted that elastomers 2 and 5, which also have an overall hardblock content of about 48%, have a much lower hardness than the elastomer made from polyol at a hardblock content of 48%. The same applies to elastomers 4 and 7 compared to the elastomer made from polyol at a hardblock content of 42%.

Example 2

Non-blown elastomers were made by mixing the polyol blends and polyisocyanates as given in Table 3 for 15 seconds and casting the mixture at 2 mm thickness in an open mould which was kept at 80° C. After 5 minutes the elastomer was demoulded and post cured in an oven at 100° C. for 4 hours. Table 3 gives the ingredients used, the amounts in pbw and some physical properties.

TABLE 3

| | Elastomer | | | | |
|---|---|---|---|---|---|
| Polyol Blend | 1 | 2 | 3 | 4 | 5* |
| 2-methyl-1,3-propanediol | 14.92 | 11.90 | 8.23 | 7.05 | 21.88 |
| Dabco EG | 0.15 | 0.12 | 0.16 | 0.21 | 0.10 |
| Polymeric material B1 | 37.3 | 50 | 65 | 70 | 0 |
| Suprasec 2020 | 47.65 | 38.01 | 26.56 | 22.95 | 75.93 |
| Hardblock content of the matrix, % | 100 | 100 | 100 | 100 | 100 |
| Hardness, Shore A, ISO 868 | 98 | 80 | 44 | 22 | off scale |
| Tg, ° C. | 63.6 | 38.2 | 9.3 | −6.0 | 125 |

*is a comparative example not using polymeric material B; the elastomer was deformed and contained many bubbles; the material was useless. The maximum of the exotherm was about 265° C.; clearly above the decomposition temperature of the elastomer which is at about 200° C.

The Tg is defined as the maximum of tan delta determined by dynamic mechanical thermal analysis (DMTA) measurement with TA Q800 DMTA in dual cantilever mode at a frequency of 1 Hz (ASTM D4065).

From the results of Table 2, a curve plotting $T_g$ vs. the amount of Polymeric Material B1 is depicted in FIG. 1.

In order to prepare a material with a Tg of e.g. 80° C. one should use about 24 parts by weight of this polymeric material B and about 76 parts by weight of these ingredients for making matrix A.

Example 3

Dabco TMR, a trimerization catalyst from Air Products based on a quaternary ammonium salt, was blended with the polymeric material B. This mixture was then mixed with polyisocyanate and subsequently poured in a mould which was kept at 80° C. This casting was subsequently heated for 4 hours at 140° C.

An elastomeric material according to the present invention was obtained which had a Shore D value as indicated in below Table 4, also giving the type of ingredients and the amounts (in parts by weight).

TABLE 4

| | Experiment | | |
|---|---|---|---|
| | 1 | 2 | 3 |
| Suprasec 2015 polyisocyanate, ex Huntsman | 80 | 70 | 80 |
| Polymeric material B  1 | 19.9 | 29.9 | — |
| 3 | — | — | 19.9 |
| Dabco TMR | 0.1 | 0.1 | 0.1 |
| Shore D hardness, ISO 868 | 85 | 80 | 85 |

The hardblock content in all three experiments was 100%.

Suprasec 2015 is an isocyanate terminated prepolymer based on MDI type polyisocyanates and a polyol having a molecular weight below 500, the prepolymer having an NCO value of about 27% by weight.

The invention claimed is:

1. An elastomeric material having a density of more than 100 kg/m³ and comprising:
    (a) a matrix material comprising a plurality of urethane, urea and/or isocyanurate groups and having a hardblock content of more than 50%; and
    (b) a polymeric material which 1) has no groups which are able to form a urethane, urea or isocyanurate group with an isocyanate group, 2) is interpenetrating said matrix, and 3) is the reaction product of a polyisocyanate and a polymer having one isocyanate-reactive group at an isocyanate index of 100-250; and wherein the relative amount of all ingredients used to make said matrix and said polymeric material, on a weight basis, ranges from 10:90 to 90:10; and wherein the polymeric material is the reaction product of an aromatic polyisocyanate and a polymer having an average molecular weight of 800-3000 which comprises monoamines and/or monocarboxylic acids having polyester, polyether and/or polyolefin backbones, or mixtures thereof.

2. The elastomeric material according to claim 1 wherein the hardblock content of said matrix is at least 75%.

3. The elastomeric material according to claim 1 wherein the hardblock content of said matrix is at least 90%.

4. The elastomeric material according to claim 1 wherein the density of the elastomeric material is at least 500 kg/m³.

5. The elastomeric material according to claim 1 wherein the matrix is a thermosetting material.

6. The elastomeric material according to claim 1 wherein the relative amount of all ingredients used to make the matrix and the polymeric material, on a weight basis, ranges from 20:80 to 80:20.

7. A process for preparing an elastomeric material according to claim 1 comprising reacting the ingredients for making the matrix in the presence of the polymeric material wherein the relative amount of the ingredients for making the matrix and the polymeric material, on a weight basis, ranges from 10:90 to 90:10.

8. A process for making an elastomeric material having a density of more than 100 kg/m³ and a predetermined glass transition temperature, the process comprising:
  1) selecting a) the ingredients for making a matrix material having a hardblock content of more than 50% and comprising a plurality of urethane, urea and/or isocyanurate groups and b) a polymeric material which has no groups which are able to form a urethane, urea and/or isocyanurate group with an isocyanate group and which material is the reaction product of a polyisocyanate and a polymer having one isocyanate reactive group at an index of 100-250, and wherein the polymeric material is the reaction product of an aromatic polyisocyanate and a polymer having an average molecular weight of 800-3000 which comprises monoamines and/or monocarboxylic acids having polyester, polyether and/or polyolefin backbones, or mixtures thereof;
  2) selecting from a representation, plotting the relationship between the weight ratio of the selected ingredients and the selected material on the one hand and the glass transition temperature of the elastomer made from these selected ingredients and this material on the other hand, the weight ratio corresponding to the predetermined glass transition temperature;
  3) mixing the selected ingredients and the selected material in the selected weight ratio; and
allowing this mixture to react.

* * * * *